No. 608,630. Patented Aug. 9, 1898.
F. T. WRIGHT.
MEANS FOR EXTRACTING PITH OR CELLULOSE FROM CORNSTALKS.
(Application filed Jan. 29, 1898.)
(No Model.) 2 Sheets—Sheet 1.
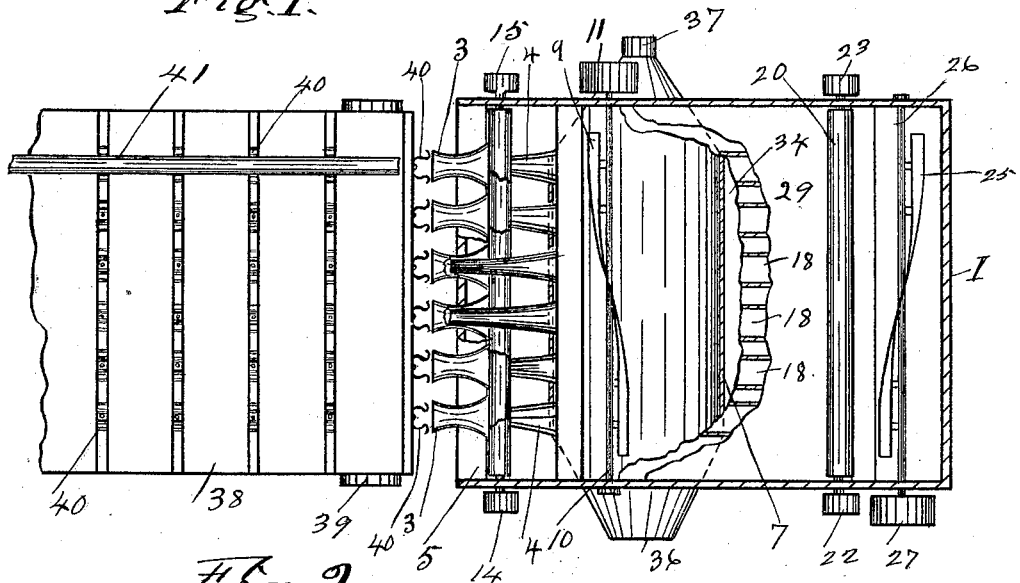
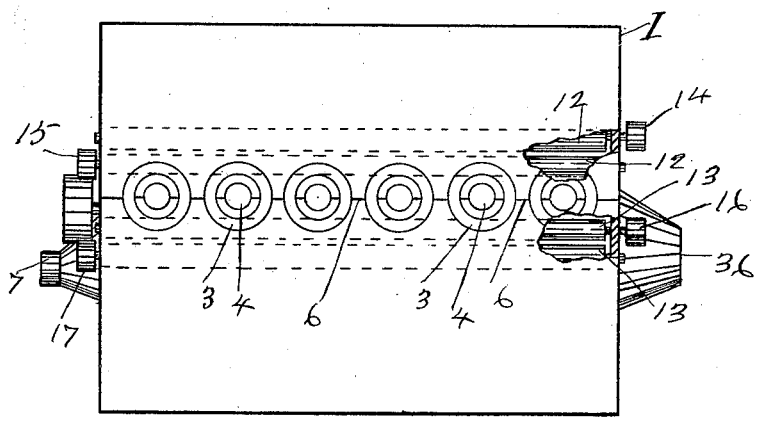
WITNESSES: Francis T. Wright—INVENTOR
Adelaide Kearns.
Loretto Noll.
BY Chapin & Denny
His ATTORNEYS.

No. 608,630. Patented Aug. 9, 1898.
F. T. WRIGHT.
MEANS FOR EXTRACTING PITH OR CELLULOSE FROM CORNSTALKS.
(Application filed Jan. 29, 1898.)
(No Model.) 2 Sheets—Sheet 2.
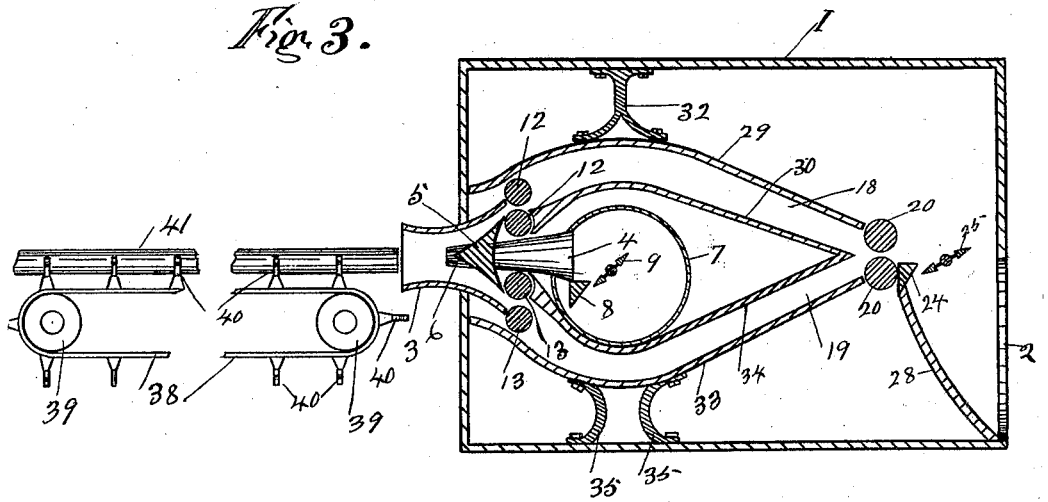
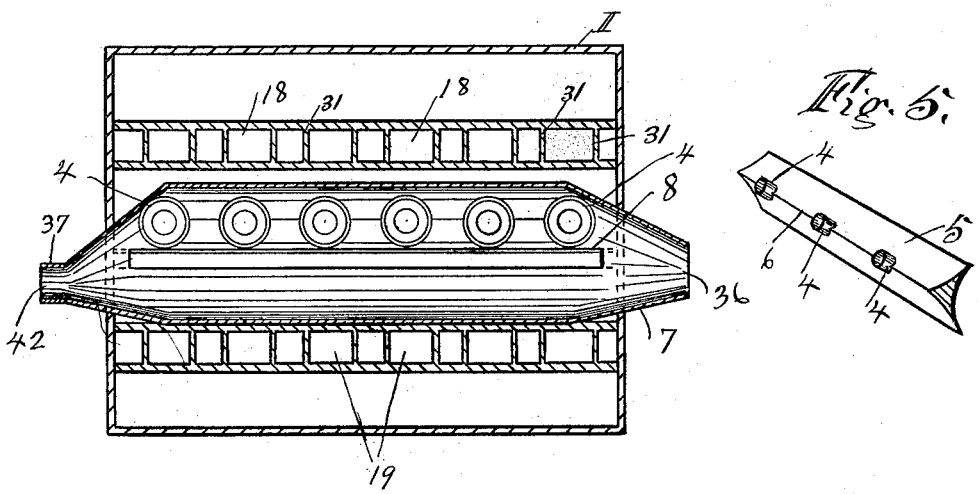
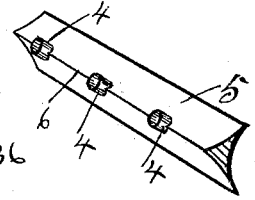
WITNESSES: Francis T. Wright — INVENTOR
Adelaide Kearns.
Loretto Noll
BY Chapin & Denny
HIS ATTORNEYS.

UNITED STATES PATENT OFFICE.

FRANCIS T. WRIGHT, OF EDINBURG, INDIANA.

MEANS FOR EXTRACTING PITH OR CELLULOSE FROM CORNSTALKS.

SPECIFICATION forming part of Letters Patent No. 608,630, dated August 9, 1898.

Application filed January 29, 1898. Serial No. 668,440. (No model.)

*To all whom it may concern:*

Be it known that I, FRANCIS T. WRIGHT, a citizen of the United States, residing at Edinburg, in the county of Johnson, in the State of Indiana, have invented certain new and useful Improvements in Means for Extracting the Pith or Cellulose from Cornstalks; and I do hereby declare that the following is a full, clear, and exact description of the invention, which will enable others skilled in the art to which it appertains to make and use the same, reference being had to the accompanying drawings, which form part of this specification.

My invention relates to improvements in means for extracting the pith or cellulose of cornstalks and converting the nutritious portion of the stalk into a food product.

It is well known that the pith or cellulose of cornstalks is indigestible and wanting in nutrition and is therefore valueless for food, but that when extracted from its fibrous coating or sheath it has a newly-discovered utility and commercial value for a great variety of uses, such as a flexible and resilient lining for war vessels, as a substitute for cotton-waste for packing the journals of railway-cars, for the manufacture of linen paper, and numerous other purposes.

It is also known that the chief hindrance to the more general use of such product for said uses has been the expense and inconvenience of extracting or separating it from its fibrous sheath, which has heretofore been accomplished by a tedious preliminary process of sweating and drying the stalks and then putting them through an attrition-mill.

The object, therefore, of my present invention is twofold—first, to provide a simple, economical, and efficient means for extracting the pith or cellulose of cornstalks without the necessity of any preliminary process for the preparation of said cornstalks, and, second, to provide an economical means of converting the shell or fibrous portion of the cornstalks into a nutritious food product.

My invention consists of a containing-box, frame, or casing, a series of short tubular hoppers fixed in the front end of said casing, a triangular divider arranged transversely in said tubes adapted to cleave the stalk-shell and guide its diverging sections to the feed-rollers, a series of pith-receiving tubes fixed in said divider with their rear ends discharging into a common pith drum or receptacle, feed-rollers revolubly mounted in said casing at the discharge end of said hoppers and adapted to feed the stalks to the divider and discharge their shell-sections rearwardly, a series of converging chutes leading rearwardly for the sheath-sections, a pith-receiving drum, means for feeding the stalks into the hoppers, and means for converting said sheath-sections into a food product.

The principal novel feature of my invention is found in the means for removing and separating the stalk-shell from the pith.

In the accompanying drawings, in which similar reference-numerals indicate like parts throughout the several views, Figure 1 is a plan view of my improvement, taken in horizontal section, with the pith-drum in longitudinal section and with the upper discharge-chute broken away in part to show the general arrangement of the operative mechanism and also showing the means for feeding the stalks into the guiding-tubes. Fig. 2 is a front end view of the same, broken away in part to show the upper and lower feed-rollers. Fig. 3 is a longitudinal vertical section of the same, showing the relative arrangement of the stalk-shell divider, the pith-receiving tubes, and the feed-rollers and also shows a side view of the means for feeding the stalks to the tubular hoppers. Fig. 4 is a transverse section, looking from the rear, showing the upper and lower discharge-chutes and the pith-receiving chamber with the pith-tubes in position therein. Fig. 5 is a detail perspective of the divider with the pith-tubes fixed in position therein, showing their relative arrangement with the cutting edge of said divider.

Referring now to the drawings, the rectangular box, supporting-frame, or casing 1 may be of any desired material, contour, or dimensions and may be fixed upon any suitable support or may be mounted upon any proper ground-wheel or carrying-truck. This casing 1, which may be inclosed, as shown, or may be an open supporting-frame, has at its rear end a discharge-opening 2, Fig. 3, for the stalk-shell sections after they have been acted upon by the revolving cutter, by which they are divided, and is provided upon its front face with a series of circular horizontal openings, in which are rigidly fixed in any proper manner the tubular hoppers 3, preferably six in number. These tubular hoppers of any proper size are flaring at both ends for the purpose hereinafter described, and are adapted to receive the outer ends of a second series of metallic pith-tubes 4, Figs. 1 and 3. These tubes 4 are rigidly fixed in horizontal alinement in a transverse triangular metallic divider-bar 5 whose opposite ends are properly secured in the sides of said box 1. The divider 5 has a sharp cutting edge 6, whose sections are in diametric relation to said tubes 4 and whose forward divergent faces are preferably slightly concave, as shown. The function of the said divider is to cleave the cornstalk-sheath diametrically and by means of its said divergent faces to direct the sheath-sections to adjacent sets of feed-rollers, presently to be described. The said tubes 4 have their forward ends, which protude slightly beyond the cutting edge 6 of the divider, provided with a knife-edge and are arranged in concentric relation in said guiding-tubes, Fig. 3. The function of these tubes is to separate the pith from its fibrous covering or shell and discharge it into a transverse pith receptacle or drum 7, having upon its front face a series of openings, in which the enlarged and flaring rear ends of said pith-tubes are arranged. Within said drum adjacent to and below the discharge ends of said pith-tubes 4 is arranged the table 8, whose opposite ends pass out through suitable openings in the conical ends of said drum and are rigidly fixed in the sides of said containing-box 1. This table assists in supporting the discharge ends of said pith-tubes and supports the pith while being acted upon by the cutting knife or blade 9 of common or any proper form rigidly fixed on the revoluble shaft 10, mounted in suitable bearings in the sides of said box and having upon one end thereof a driving-pulley 11. The speed of the cutting-knife 9 is regulated in accordance with the lengths into which it is desired the pith be divided. Immediately adjacent to and in the rear of said hoppers 3 and the said divider 5 are arranged the upper feed-rollers 12 and the lower feed-rollers 13, whose opposite ends have suitable bearings in the sides of said box or frame 1 and which are provided upon one extremity thereof with a proper belt-pulley 14, 15, 16, and 17, respectively connected with any source of power.

The upper feed-rollers 12 are adapted to receive the upper half or section of the cornstalk and feed it rearwardly through the respective chutes 18 to the feed-rollers 20, while the lower feed-rollers 13 simultaneously feed the lower half or section of the stalk-shell through the chutes 19 to said feed-rollers 20, which are also revolubly mounted in suitable bearings in the side of said box 1 and have upon one end thereof proper belt-pulleys 22 and 23, Fig. 1. Immediately adjacent to the rear face of the lower one of said rollers 20, but not in contact therewith, is arranged a table 24, whose ends are fixed in the opposite sides of said box 1. This table supports the stalk-shell sections while they are being cut up into fine pieces for cattle-food. Directly at the rear and in close proximity to said table 24 is arranged a cutting knife or blade 25, rigidly fixed upon a rotary shaft 26, mounted in proper bearings in the sides of said box 1 and having upon one extremity thereof a belt-pulley 27. An inclined transverse partition 28, properly fixed in said box, extends from said table 24 to the lower edge of the said discharge-opening 2 and serves as a discharge-chute for the finely-divided shell-sections as they fall from the cutting-knife 25, after which they may be ground or subjected to further preparation for cattle-food in any desired manner. The convex plates 29 and 30 33 and 34, approximately in parallel arrangement, respectively, Figs. 3 and 4, are fixed to the sides of said box 1 in any proper manner and are rigidly connected by the longitudinal spaced partitions 31, thereby forming a series of upper and lower chutes 18 and 19 of any proper size, corresponding in number, respectively, with the said guide and said pith-tubes. The said plates may be further respectively stayed and secured by the pendent brace 32 and the upright braces 35. The front edge of the plates 29 and 33 are or may be fixed to the front end of said box 1; but the front edge of the plates 30 and 34 terminate adjacent to the rear face of the inner feed-rollers 12 and 13, Fig. 3.

The cylindrical pith-drum 7 is provided at one end with a conical extension terminating in a discharge-opening 36 and at the other end with a conical extension having a tubular termination 37, adapted to be connected in any proper manner with an air-blast pipe and centrifugal fan or blower of well-understood construction, but not shown.

As some positive means of feeding the cornstalks to the pith-tubes 4 and the divider 5 in the said hopper-tubes prior to the action of the said feeding-tubes 12 and 13 is required, I have provided an endless carrier of common construction, comprising an endless belt 38, mounted on rollers 39, which are properly mounted on any suitable support and provided with a plurality of transverse slats, fixed thereon, having a series of spring-clasps 40, Fig. 1, adapted to embrace and detachably secure a cornstalk 41 when arranged therein, as shown, and are adapted to carry and feed simultaneously as many cornstalks as there are tubular hoppers.

Obviously the means for feeding the cornstalks into the hopper-tubes is immaterial to my present invention and may be indefinitely varied.

The operation of my invention is readily understood, and briefly stated is as follows:

The cornstalks 41, having been first topped at or below the husk, stripped of their blades, and sorted relative to their diameter, are placed in position upon the supporting-clasps 40, which are so arranged as to bring the said stalks in direct alinement with the respective hopper-tubes into which they are fed by the said carrier, which is actuated by a belt connection with the driving power or other manner, the said clasps readily releasing their grip upon said stalks as they successively pass beneath said carrier-rollers. As the stalks—preferably six in number for each machine—enter their respective hopper-tubes they are pierced longitudinally by the pith-tubes, which are adapted to encircle and receive the pith thereof, while the knife-edge sections of the divider upon each side of the pith-tubes, but within the hopper-tubes, simultaneously split or cleave the said stalk-sheaths diametrically into two horizontal sections, which are then guided by the flaring adjacent faces of the divider and the inner end of the hopper-tubes to the said upper and lower feed-rollers 12 and 13, respectively, Fig. 3, from whence they are forced by said feed-rollers through their respective upper and lower chutes 18 and 19 to the discharging-rollers 20, which are adapted to receive the adjacent end of said stalk-sections shortly before they pass beyond the control of their respective feed-rollers 12 and 13. As the said pith passes into the interior of said drum through the inner flaring end of said pith-tubes it is cut up into short sections of any desired length as it passes over the said table 8 by means of the revolving knife 9, after which it is continuously forced out of the pith-chamber of said drum through the discharge-opening 36 by a proper air-blast turned into said chamber at said opening 42. As the stalk-shell sections pass over the said table 24 from the discharge-rollers 20 they are acted upon by the said revolving knife 25 for cattle-food, as described, and discharged through the opening 2.

Obviously the pith-tubes 4 may be of different diameters for different-sized cornstalks, which are previously sorted as to size, though I prefer to have the said tubes of uniform size in the same machine.

My improvement thus constructed can readily be mounted upon proper ground-wheels and conveniently transported from place to place.

While I have shown my invention as operated by belts and pulleys, sprocket-wheels and driving-chains can readily be substituted therefor if desired.

I do not hereby limit myself to the precise details of construction, as they may be indefinitely varied without departing from the spirit and scope of my invention, which consists, broadly, in providing means for splitting the stalk-shell diametrically, extracting and separating the pith therefrom without any prior treatment or preparation, and converting the shell-sections into a food product by a single operation.

Having thus described my invention and the manner of employing the same, what I desire to secure by Letters Patent is—

1. In a machine for extracting and separating the pith of cornstalks from the shell thereof a plurality of tubular feeding-hoppers in horizontal alinement; a transverse divider arranged in said hoppers as shown, and adapted to split or divide the stalk-shell longitudinally in approximately equal sections and direct such sections in diverging directions to feeding-rollers therefor respectively; a plurality of pith-receiving tubes mounted in said divider as shown and arranged in concentric relation to said hoppers, having a knife-edge on their forward end and adapted to separate the pith from its containing-shell; and a plurality of feeding-rollers in close proximity to and in coöperative relation with said divider and pith-tubes, adapted to assist in continuously feeding said stalks to said divider and pith-tubes.

2. In a machine of the class specified, the combination of the feeding-hoppers in horizontal alinement; a transverse divider fixed in the rear end of said hoppers as shown and adapted to longitudinally sever the cornstalk-shell into two sections and to direct such sections in diverging directions to adjacent feed-rollers; a plurality of knife-edged tubes concentrically arranged in said hoppers, and rigidly mounted in said divider as shown, with their cutting-edge slightly advanced, and adapted to separate the pith from its containing-sheath which is simultaneously split by the said divider; feeding-rollers adapted to engage said sheath-sections and thereby continuously feed the stalks to the divider and pith-tubes; a pith-drum into which the said pith-tubes discharge; and means for continuously severing the discharging pith into short segments into said drum.

3. The combination in a cellulose-extracting device of a fixed transverse divider or cutter-bar passing diametrically through a plurality of feeding-hoppers, and adapted to sever the cornstalk-shell longitudinally and direct its sections to proper feeding-rollers; a series of pith-tubes having their forward cutting ends fixed in said divider-bar in concentric relation to said feeding-hoppers and having their rear ends mounted in suitable openings in the pith-drum, adapted to receive and separate the pith from its containing-sheath as it is continuously fed forward to said tubes and longitudinally severed by said divider; feeding-rollers in coöperative relation with said divider and adapted by an actuating engagement with said sheath-sections, to assist in continuously feeding the said cornstalks; a pith drum or receptacle adapted to receive the pith as it is discharged from said tubes; means for dividing the pith into small segments in said receptacle; converging chutes for the said sheath-sections leading from the feeding-rollers to the discharge-rollers; a pair of discharge-rollers at the meeting ends of said chutes and a suitable cutter in close proximity to said discharge-rollers adapted to finely divide said discharge sheath-sections for the purpose specified, all substantially as described.

4. In an apparatus of the class described, the combination of a fixed divider having a knife-edge to cleave or sever the cornstalk shell or sheath, and adjacent flaring sides to direct the sheath-sections in divergent directions to proper feeding-rollers; and provided with a series of lateral openings for the pith-tubes; a series of pith-extracting tubes mounted in said openings having an annular knife-edge upon their forward end which is slightly in advance of the cutting edge of the divider, and having their inner discharge end arranged in suitable openings in a proper pith-receptacle; and means for continuously feeding the cornstalks to said divider.

Signed by me, at Fort Wayne, Allen county, State of Indiana, this 26th day of January, A. D. 1898.

FRANCIS T. WRIGHT.

Witnesses:
ADELAIDE KEARNS,
THOMAS DUNCAN.